Feb. 10, 1970     D. L. MENSA     3,495,081

REAL-TIME MEDIAN COMPUTING SYSTEM

Filed Sept. 22, 1967     4 Sheets-Sheet 1

INVENTORS.
DEAN L. MENSA

Attorney

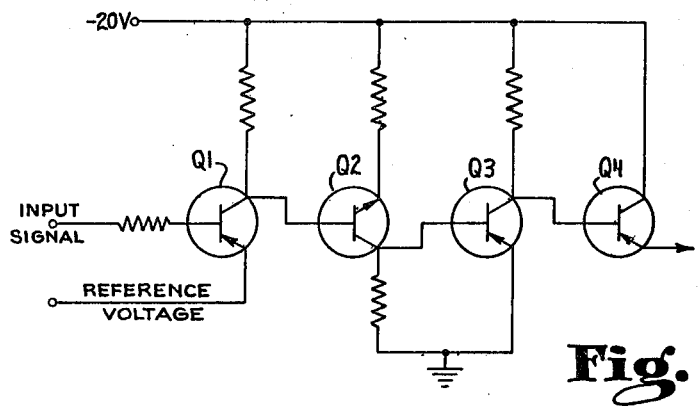
Fig. 2.
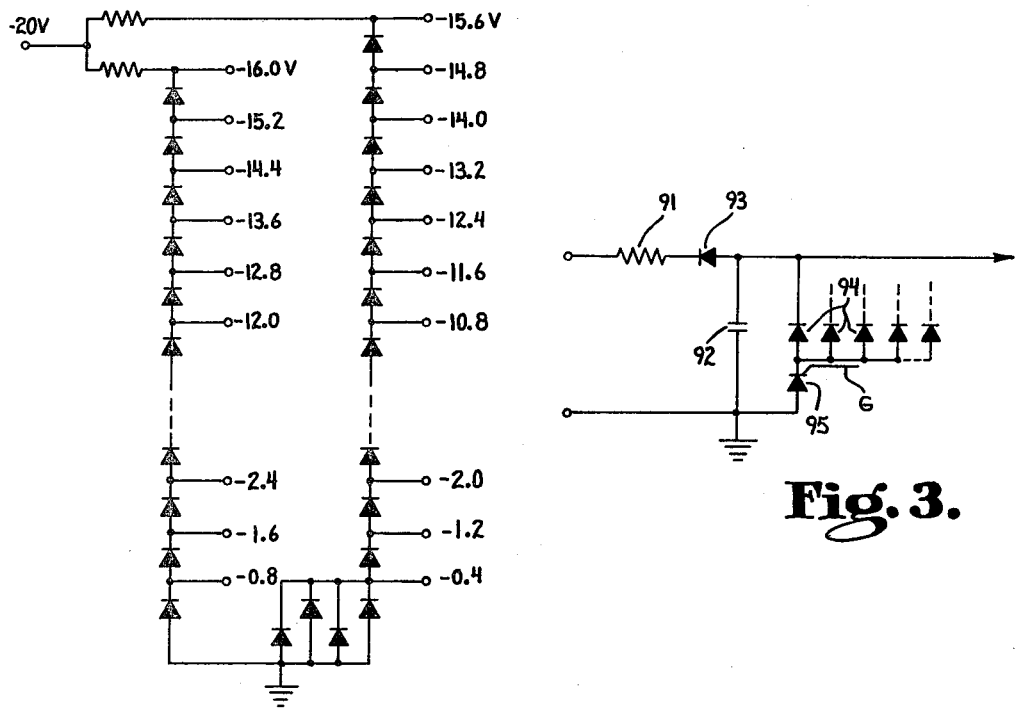
Fig. 3.
Fig. 4.

INVENTORS.
DEAN L. MENSA

Feb. 10, 1970  D. L. MENSA  3,495,081
REAL-TIME MEDIAN COMPUTING SYSTEM
Filed Sept. 22, 1967  4 Sheets-Sheet 4

INVENTORS.
DEAN L. MENSA

H. H. Loescke
Attorney

United States Patent Office 3,495,081
Patented Feb. 10, 1970

3,495,081
REAL-TIME MEDIAN COMPUTING SYSTEM
Dean L. Mensa, 954 Ann Arbor Ave.,
Ventura, Calif. 93003
Filed Sept. 22, 1967, Ser. No. 669,962
Int. Cl. G06g 7/18
U.S. Cl. 235—193
7 Claims

ABSTRACT OF THE DISCLOSURE

A real-time redian computer having a plurality of comparators to compare radar cross-section data signals (radar reflectivity factor) with stepped levels of reference voltage with the outputs integrated over progressive time intervals to provide a cumulative real time cuont to determine the cumulative time equal to one-half the total observation time to select the reference voltage of that cumulative time effectively quantizing the median voltage value from the reference voltage values for the cross-section input signal.

BACKGROUND OF THE INVENTION

This invention relates to reducing radar cross-section data of target objects to median values so that the apparent size of the target may be evaluated. This enables a radar system to be designed which will acquire and/or track a target of known physical characteristics without the possbility of the radar capabilities being exceeded and without building excessive capacity into the radar equipment.

Radar cross-section measurement data, or radar signal reflectivity, is a measure of how large a target appears to a radar system. Prior methods of making these measurements used the radar return or reflectivity signals to evaluate these signals by manual techniques of graphical data reduction. This manual graphical reduction introduced human error and required considerable time in the computation.

SUMMARY OF THE INVENTION

In this invention the median values of the radar cross-sections, or reflectivity return signals from a target, are automatically computed in a few seconds of time. The signal input is continuously applied in parallel to a plurality of voltage amplitude comparators to which are also applied a corresponding number of voltage reference levels in sequence from the lowest to the highest voltage level expected by the target signal, except that the highest reference voltage level is higher than the highest expected target voltage signal. The comparators change in output whenever the signal voltage exceeds the reference voltage thereof and these comparator outputs are each integrated in corresponding integrator circuits. The integrators are sampled in sequence and the samples compared in a median comparator with one-half the value of the highest or $n$th integrator output. When the one-half value is reached, the median comparator produces an output signal which triggers a circuit to gate through the reference voltage corresponding to the first reference voltage that was exceeded by the integrated output of the signal voltage. This reference voltage is the median voltage value for the variable signal voltage. As different aspect angles of the target object are viewed by the radar, the signal voltage varies so that each new angle of the target object produces a different median value. It is accordingly a general object of this invention to provide a median voltage value for each cross-section radar return signal voltage, the cumulative production of median voltages providing a voltage graph of the target object for evaluating the kind of target object being detected.

BRIEF DESCRIPTION OF THE DRAWINGS

These and other objects, advantages, features, and uses will become more apparent to those skilled in the art as a more detailed description of the invention proceeds when taken in view of the accompanying drawings, in which:

FIGURE 2 is a circuit schematic of the voltage amplitude comparator in block in FIGURE 1;

FIGURE 3 is a circuit schematic of the integrator circuit shown in block in FIGURE 1;

FIGURE 4 is a circuit schematic of the means for developing the several reference voltage levels shown in block in FIGURE 1;

DESCRIPTION OF THE PREFERRED EMBODIMENT

Figure 1:
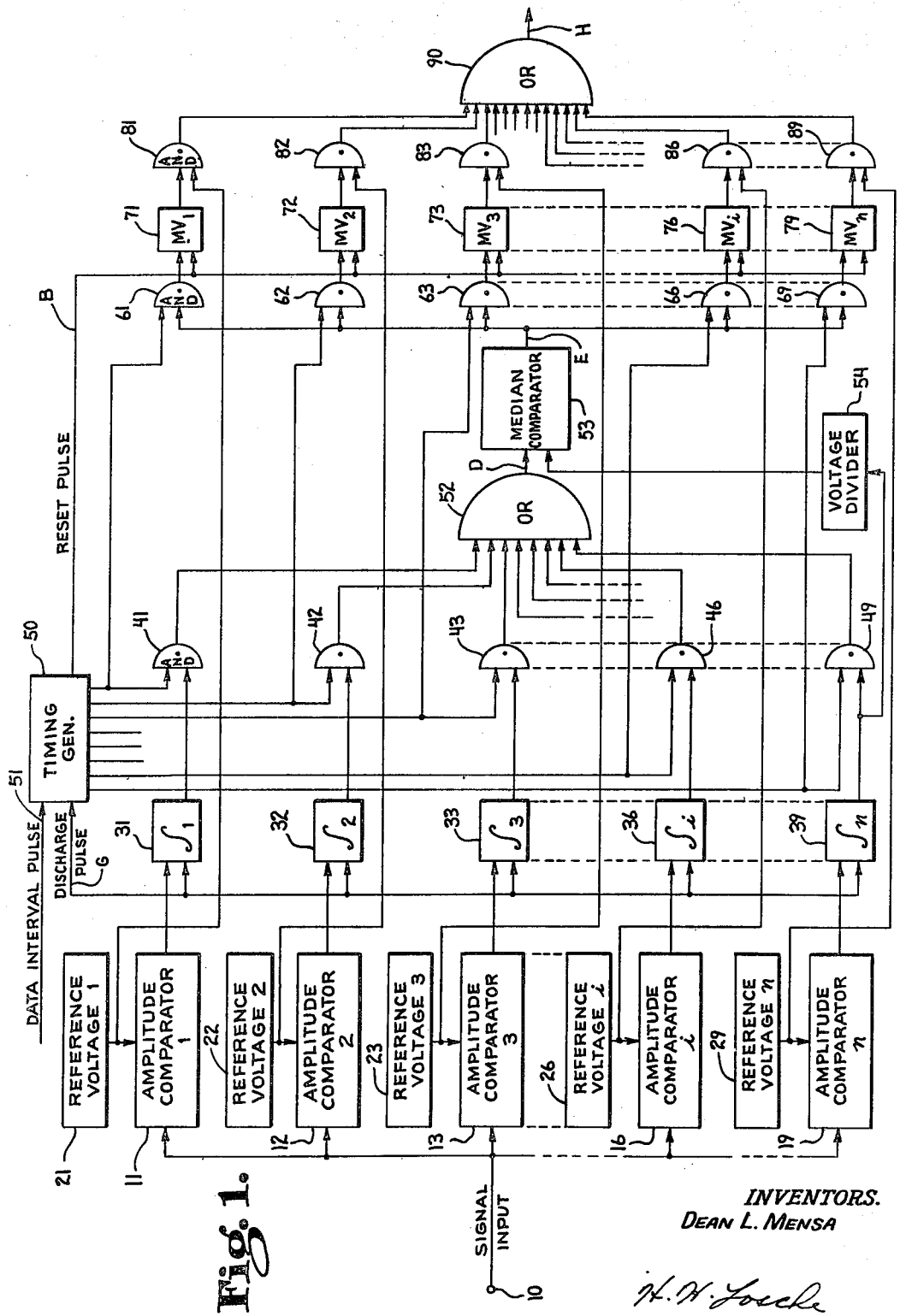
FIGURE 1 is a block circuit schematic diagram of the real-time median computing system.

Referring more particularly to FIGURE 1, and other figures as they become pertinent, of the drawings showing the median computer in block circuit schematic diagram, an input terminal 10 receives the radar cross-sectional echo signals from a radar illuminating a target object. These input signals are derived from a follow-up potentiometer mounted on the pen drive of the automatic, radar cross-section recorder (not shown). For the purpose of illustration the cross-sectional radar return signals applied to terminal 10 are of the type shown in FIGURE 8 and it is assumed for this illustration that the target object is observed throughout an aspect angle of 360 degrees, taken at 10 degree intervals. The signal input 10 is coupled in parallel to a plurality of amplitude comparators, shown as 11, 12, 13, ... 16 ... 19. While the number of amplitude comparators is a matter of choice, the accuracy of the computer can be improved with increasing number of comparators, as will later become clear. For examples used later herein forty comparator channels are used of which 11, 12, and 13 represent the first three, 16 represents any comparator, $i$, between the third and the last or $n$th amplitude comparator. Each amplitude comparator has a reference voltage 21, 22, 23, ... 26 ... 29 applied correspondingly from .4 volt to 16 volts in .4 volt steps or voltage levels; that is the reference voltage of .4 is applied to voltage comparator 11, .8 volt is applied to comparator 12, 1.2 volts are applied to comparator 13, and 16 volts are applied to the $n$th comparator 19. The amplitude comparators and reference voltage circuits are shown in FIGURES 2 and 3 which will be described later herein; howeever, let it be understood that the output of each amplitude comparator is zero when the input signal exceeds the corresponding reference voltage level, and is −20 volts when the input signal is less than the corresponding reference voltage level. The output of each amplitude comparator is through an integrator circuit 31, 32, 33, · · · 36 ... 20 in a corresponding manner to AND circuits 41, 42, 43, ... 46 ... 49. The second input to each AND circuit is from a timing generator 50 to produce 40 timing pulses of one millisecond (ms.) duration in sequence, as will be more fully described with reference to FIGURE 5. The timing generator 50 starts the generation of the timing pulses with the occurrence of a data interval pulse applied over conductor 51 from the radar circuit (not shown) which produces this pulse at the beginning of each 10 degrees of aspect angle illuminating the target object. The timing pulses cause the integrators 31, 32, 33, . . . 36 . . . 39 to be sampled in a cumulative time relation with the outputs of the AND circuits coupled as inputs to an OR circuit 52. At the end of each sampling sequence of the integrators the integrators are discharged by a discharge pulse G, shown in FIGURE 7, the development of which will be discussed with relation to FIGURE 5. The AND circuits 41–49 and the OR circuit 52 combination provide a demultiplexer to produce an output D of a wave shape shown in line D of FIGURE 7.

The output D of the demultiplexer circuit is applied as one input to a median comparator circuit 53. The other input to the median computer 53 is from the output of the $n$th integrator 39 which is passed through a voltage divider 54 to divide the integrated voltage in half. When the cumulative time of the integrated voltages sampled becomes greater than the voltage from the voltage divider circuit 54, the median comparator 53 will produce a voltage output on E corresponding to the E line in FIGURE 7.

The output E of the median comparator 53 is coupled in common for one input to each of a plurality of AND circuits 61, 62, 63, . . . 66 . . . 69, corresponding in number to the amplitude comparators and reference voltages, herein used for example as being forty. The second input to each AND circuit is from the timing generator 50; that is, the same timing generator 50 input to the AND circuit 41 is also an input to AND circuit 61, the same timing generator 50 input to AND circuit 42 is also an input to AND circuit 62, and so on through the forty AND circuits 61–69. The output of each AND circuit 61–69 is a trigger input to a corresponding bistable multivibrator circuit 71–79. The output of each multivibrator circuit 71–79 is to one input of a corresponding AND circuit 81–89. The second input to each AND circuit 81–89 is from the corresponding reference voltage 21–29. The outputs of the AND circuits 81–89 are all coupled as inputs to an OR circuit 90 producing the output H. The AND circuits 61–69, the multivibrators 71–79, the AND circuits 81–89, and the OR gate 90 is a combination constituting a logic circuit. The elements ending in a 1 or a 2, such as 11, 21, 31, 41, 61, 71, and 81; 12, 22, 32, 42, 62, 72, and 82; and so on provide channels. When the voltage on D compares with the voltage from voltage divider 54 a pulse S will gate the AND circuit in the sequence 61–69 corresponding to the AND circuit 41–49 similarly activated to trigger the multivibrator in that same channel as 16$i$, 36$i$, 46$i$, 66$i$, 76$i$, and 86$i$ to conduct reference voltage 29$i$ to the output H. This reference voltage $i$ will be the median value of the input signal at 10. Since the multivibrator 76 for channel $i$ is bistable, this reference voltage will remain on the output and the median output H will continue through the cycle as shown by the line H in FIGURE 7. This will be the median value for the 10 degrees of aspect angle shown in FIGURE 9 of the input signal in FIGURE 8. The reset pulse B from the timing generator 50 resets the multivibrators 71–79 at the beginning of each cycle of 10 degrees of aspect angle. As each 10 degrees of aspect angle is sampled, the median values will be developed automatically on the output H to produce the complete median value graph in FIGURE 9.

Referring more particularly to FIGURE 2, a circuit schematic is shown for all the amplitude comparators 11–19. The amplitude comparator is a high-gain, overdriven, direct current amplifier. The output of the amplifier switches from supply voltage, illustrated herein as being −20 volts, to zero when the input voltage exceeds the reference voltage; that is, when the input signal on the base of Q1 exceeds the reference voltage on the emitter of Q1, Q1, Q2, and Q3 will go into conduction and Q4 will be cut off to produce zero voltage output. When the input signal is lower than the reference voltage, Q1, Q2, and Q3 will be cut off and Q4 will be conducting to place −20 volts on the emitter output of Q4.

Figure 8:
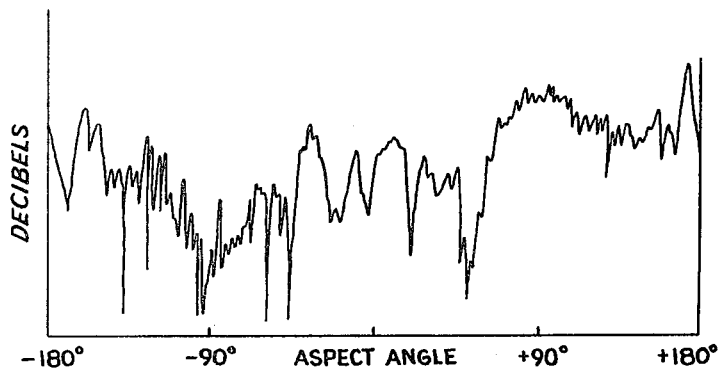
FIGURE 8 illustrates a cross-section radar target return signal varying as the aspect angle goes through 360 degrees.

The emitter output of the amplitude comparator in FIGURE 2 is coupled as an input to the integrator circuit shown in FIGURE 3. Integration is performed by the resistance 91 and capacitance 92. Diode 93 allows the capacitor 92 to charge when an output from the amplitude comparator is −20 volts and prevents the capacitor 92 from discharging when the output from the amplitude comparator is zero as by sudden drop in input signal during the 10 degree aspect angle observation as illustrated in FIGURE 8. Diodes 94 are used to reset the integrators 31–39 by discharging the capacitor 92 in each through a silicon controlled rectifier 95 when the discharge pulse on line G is applied. The silicon controlled rectifier 95 is common to all forty integrators and simultaneously discharges all the integrator capacitors 92 when the reset pulse G is applied. The output from the anode of 93 in each integrator is applied to the AND circuit in the same channel.

Referring more particularly to FIGURE 4 the 40 reference voltages are generated by the forward voltage drop of 40 diodes. Each diode has a forward voltage drop of .8 volt except the last diode of the second array which has a voltage drop of .4 volt. Forty discrete voltage levels spaced by .4 volt are obtained between the diode junctions and ground. The voltage supply source for the reference voltage arrays is −20 volts for the purpose of an operating example herein.

Figure 5:
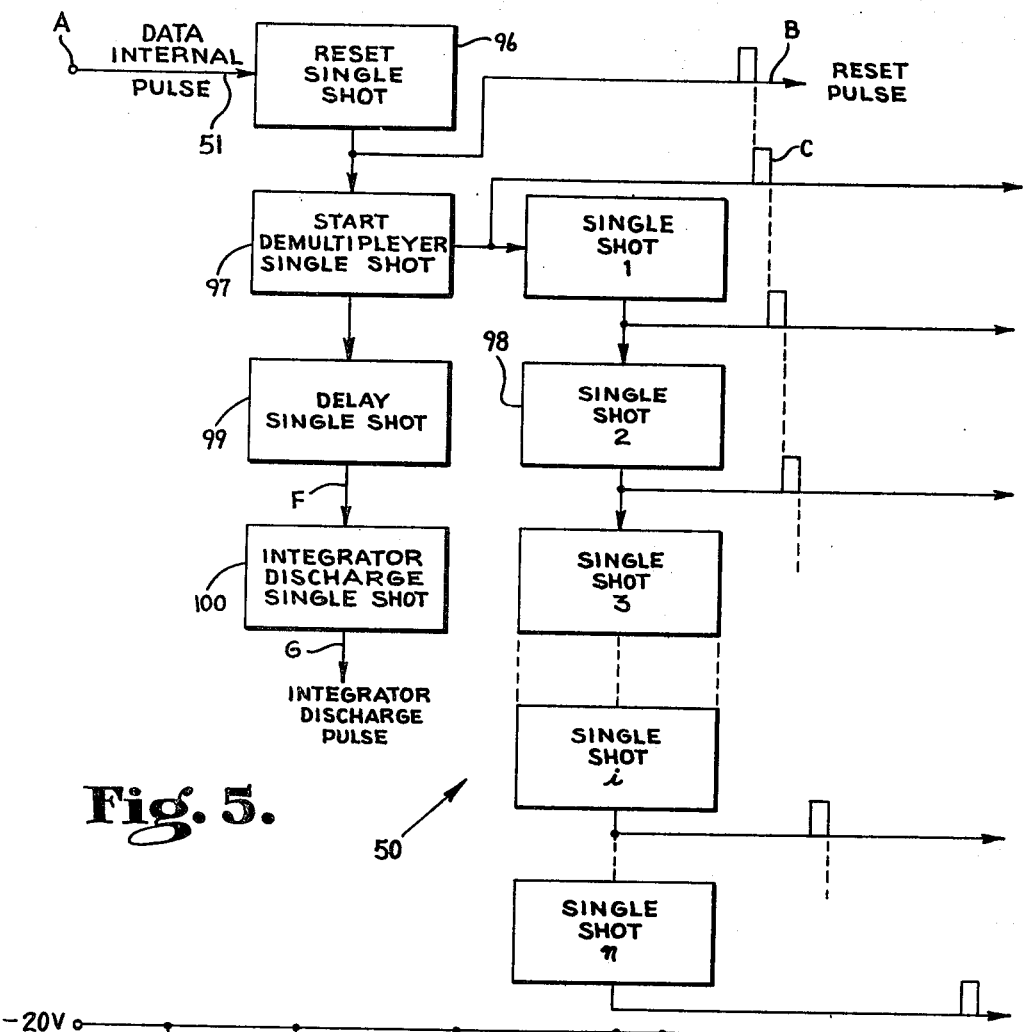
FIGURE 5 is a block circuit diagram of the timing generator shown in block in FIGURE 1.

As shown in FIGURE 5 the timing generator 50 in FIGURE 1 produces the various timing and reset pulses from the initial data interval pulse A applied on the input conductor 51. The data interval pulse A starts a single shot multivibrator 96 which produces a 1 ms. pulse used as the reset pulse B. This pulse B also triggers a start demultiplexer single shot multivibrator 97 to produce pulse C which starts the sequence of 1 ms. pulses through single shot multivibrator 98 that are so connected to make the trailing edge of each multivibrator trigger the next succeeding multivibrator. The result is a consecutive sequence of 40 equal-amplitude 1 ms. pulses. These are coupled to the AND circuits 41–49 and 61–69 to cause channel sampling in sequence from top to bottom, as viewed in FIGURE 1. The single shot multivibrator 97 also triggers a delay single shot multivibrator 99 to provide a 40 ms. delay pulse F. The trailing edge of pulse F produced by 99 triggers an integrator discharge single shot multivibrator 100 to produce the long discharge pulse G. Thus, the integrator discharge pulse G discharges all the integrators 31–39 at the end of each cycle between data interval pulses A while the reset pulse B resets all multivibrators 71–79 at the very start of each cycle.

Figure 6:
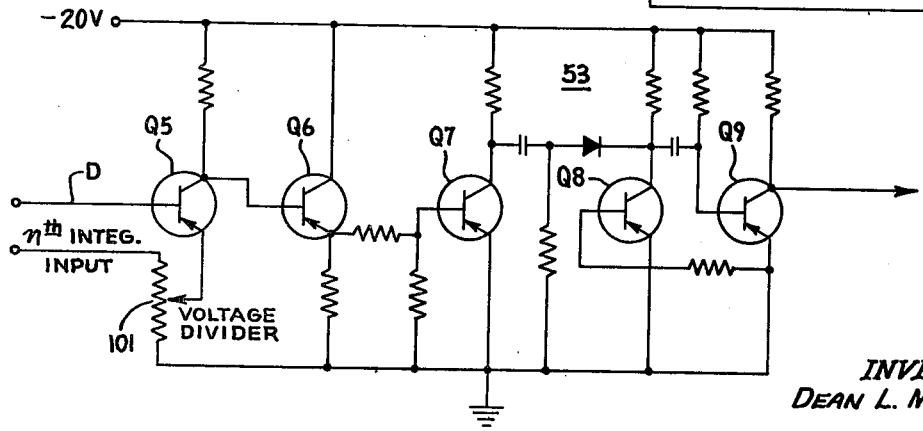
FIGURE 6 is a circuit schematic diagram of the median comparator shown in FIGURE 1.

Referring more particularly to FIGURE 6 where the median comparator in FIGURE 1 is shown in circuit schematic form, five transistors Q5–Q9 are used to produce high-gain to switch from −20 volts to zero volts as the input D exceeds one-half of the $n$th integrator 39 voltage output. The output D from the demultiplexer is applied to the base of Q5 and the divided voltage used as a reference is applied to the emitter of Q5. The voltage divider is shown as a potentiometer 101 for calibrating the half voltage. When the input voltage on the base of Q5 is less than the voltage on the emitter of Q5, Q5 and Q9 will be cut off and Q6, Q7, and Q8 will be conducting to produce −20 volts on the collector output of Q9. When the Q5 voltage is higher than the Q5 emitter voltage, Q5 and Q9 will be conducting and Q6, Q7, and Q8 will be cut off to produce zero voltage on the collector output of Q9.

Figure 7:
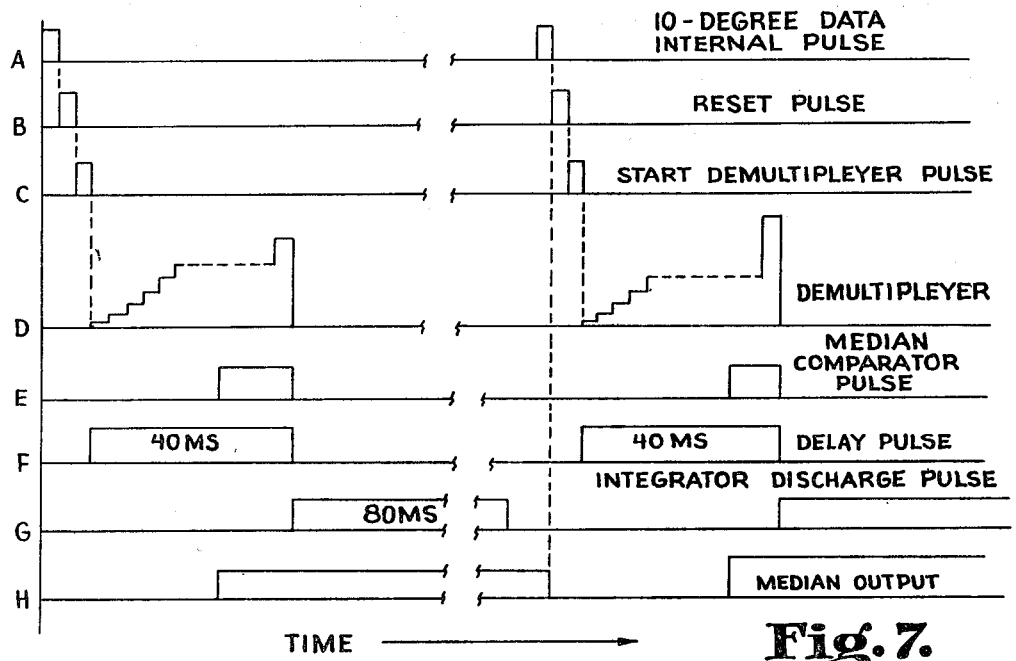
FIGURE 7 illustrates the various voltage signals developed in the median computer in accordance with time.
Figure 9:
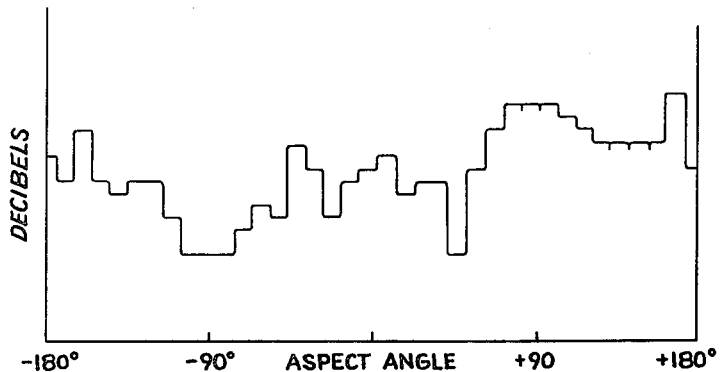
FIGURE 9 illustrates the median voltage graph for the target signals of FIGURE 8.

FIGURE 7 illustrates the sequence of the several pulses generated in the median computer system of FIGURE 1. Since the input signal at 10 is variable, the demultiplexer output D will vary in amplitude, as shown by contrast of the two waveforms in FIGURE 7. As has been stated hereinabove, FIGURE 8 illustrates an input cross-section radar signal throughout the aspect angle of 360 degrees. FIGURE 9 is a graph of the median values at every 10 degree aspect angle of the cross-section input signal in FIGURE 8.

OPERATION

In the operation of the real time median computing system, as shown in FIGURE 1, let it be assumed that input signals of radar cross-section return, as shown in FIGURE 8, are applied to terminal 10 in 10 degree aspect angle intervals. Let it be assumed further that there are 40 channels beginning with the amplitude comparators. The amplitude of the input signal will be greater than the reference voltages in the lower voltage levels but at some amplitude comparator, for example the 20th comparator, the reference voltage will remain higher and will be higher in all succeeding comparators to comparator $n$. With the integrators 31-39 discharged at the beginning of the cycle these integrators will start charging from the 20th to the $n$th where the −20 volts is applied thereto. The timing generator will sample each integrator output down the channels in accordance with the time accumulated at the 1 ms. sampling rate. As the 20th through the $n$th integrators are sampled the output voltage D from the OR gate 52 will rise until it becomes equal to or greater than the one-half output of integrator $n$ at which time an output will be produced at E. The pulse output E will be applied to all AND gates 61-69 but only one AND gate will be open. If at the time the comparator output E was produced the 1 ms. pulse had opened AND gate 46 in channel $i$, then this same 1 ms. pulse will open AND gate 66 in channel $i$ to trigger the multivibrator 76 in channel $i$. Switching of multivibrator 76 opens AND gate 86 in channel $i$ to pass the reference voltage $i$ through the OR gate 90 to the output H. This reference voltage $i$ will remain on the output H until the end of the 10 degree cycle since the multivibrator is bistable and will not revert back to its first state until the reset pulse B occurs. The $i$ reference voltage on the output H is the median voltage of the first 10 degrees of input signal. The next median value is found for the next 10 degrees of target object scan as above described. After 36 cycles of 10 degree computations, a complete real-time graphical picture will be produced, as shown in FIGURE 9, for evaluation of the cross-sectional data of the target.

As seen in FIGURES 5 and 7 the delay single shot 99 delays the integrator discharge pulse F for 40 ms. to allow all 40 channel integrators to be sampled before the integrators are discharged. The integrator discharge pulse starts at the trailing edge of the 40 ms. pulse F and continues for about 80 ms. During the 80 ms. interval in which the integrators are being discharged the system is not processing the input data. The effect of this dead time can be neglected because it is a small fraction of the total data interval time which may be from four to twenty seconds, depending on the adjustment of the radar cross-section recorder by the radar operator.

In this manner the median values are computed in real time of target objects illuminated by radar signals to obtain the cross-section measurement of the target. While many modifications and changes may be made in the constructional details and features of the invention, as described, without departing from the true spirit of the invention, I desire to be limited in my invention only by the scope of the appended claims.

I claim:
1. A real time median computing system comprising:
    a plurality of channels, each channel including an amplitude comparator, an integrator, and a first AND circuit coupled in series, and a second AND circuit, a multivibrator, and a third AND circuit coupled in series;
    a signal input coupled in common to each channel by coupling one input of each amplitude comparator;
    a reference voltage supply having a plurality of voltage outputs in small step voltage increments, one each step voltage reference output being coupled as the second input to each said amplitude comparator and coupled as one input to each of said third AND circuits in corresponding channels to provide step increased reference voltages to said amplitude comparators and a voltage to be gated through said third AND circuits;
    a timing generator for producing progressively timed pulses on separate outputs that are coupled as a second input to each of said first and second AND circuits in corresponding channels to gate said channels in sequence;
    a first OR gate and a median comparator coupled in series to receive all the outputs of said first AND circuits on inputs to said first OR gate and to apply the median comparator output in common as the other input to all said second AND circuits;
    a voltage divider coupled between the output of the integrator in the channel having the highest reference voltage applied thereto and the other input to said median comparator, said voltage divider dividing said integrated voltage output substantially in half; and
    a second OR gate coupled to receive the outputs of all said third AND gates to produce on its output the computed median voltage value of a variable signal input to said amplitude comparators whereby the reference voltage level is selected by sampling the integrator voltage outputs on a real-time basis at a value of substantially one-half the value of the integrator in the channel having the highest reference voltage applied thereto.

2. A real-time median computing system as set forth in claim 1 wherein
    said timing generator produces pulses on outputs coupled to said integrators for discharging same after each sampling cycle and on outputs coupled to said multivibrators for resetting same at the beginning of each sampling cycle.

3. A real-time median computing system as set forth in claim 2 wherein
    said reference voltages are produced by a plurality of diodes in series across a supply voltage, the reference voltages being taken from the junction point between said diodes to produce said step reference voltages by virtue of the voltage drop across each diode.

4. A real-time median computing system as set forth in claim 3 wherein
    said amplitude and median comparators are each transistor amplifiers of high gain that switch rapidly from a zero to a high voltage output, and vice versa, as the crossover occurs for the compared voltage.

5. A real-time median computing system as set forth in claim 4 wherein
    said timing generator includes a plurality of one shot multivibrators coupled and arranged in a series manner to have the trailing edge of a pulse produced by the preceding multivibrator to trigger the succeeding multivibrator in a sequence to produce a series of equal amplitude, consecutive pulses.

6. A real-time median computing system as set forth in claim 5 wherein
    said voltage divider is a potentiometer whereby the one-half voltage division can be calibrated.

7. A real-time median computing system as set forth in claim 6 wherein
    said integrator in each channel is a resistance-capacitance network with a diode in series with said resistance and the integrator output and said timing generator coupling to said integrator is to the control electrode of a silicon controlled rectifier having its anode and cathode coupled between said capacitance and a fixed potential.

References Cited

UNITED STATES PATENTS 3,183,342   5/1965   Wortzman _____ 235—193 X
3,209,250   9/1965   Burns et al.
3,403,327   9/1968   Welz _____ 235—193 X MALCOLM A. MORRISON, Primary Examiner JOSEPH F. RUGGIERO, Assistant Examiner U.S. Cl. X.R.

235—183